United States Patent
Hintze-Bruening et al.

(10) Patent No.: US 7,935,291 B2
(45) Date of Patent: May 3, 2011

(54) METHOD FOR PRODUCING MOLDED PLASTIC PARTS HAVING FUNCTIONAL SURFACES

(75) Inventors: Horst Hintze-Bruening, Münster (DE); Markus Saedler, Münster (DE); Fatmir Raka, Münster (DE)

(73) Assignee: BASF Coatings AG, Munster (DE)

( * ) Notice: Subject to any disclaimer, the term of this patent is extended or adjusted under 35 U.S.C. 154(b) by 991 days.

(21) Appl. No.: 10/595,060

(22) PCT Filed: Jul. 13, 2004

(86) PCT No.: PCT/EP2004/007698
§ 371 (c)(1),
(2), (4) Date: Jan. 25, 2006

(87) PCT Pub. No.: WO2005/016641
PCT Pub. Date: Feb. 24, 2005

(65) Prior Publication Data
US 2007/0110905 A1    May 17, 2007

(30) Foreign Application Priority Data
Aug. 4, 2003   (DE) .................. 103 35 620

(51) Int. Cl.
*B29C 45/14*    (2006.01)
(52) U.S. Cl. ........................... 264/265
(58) Field of Classification Search ............ 264/265
See application file for complete search history.

(56) References Cited

U.S. PATENT DOCUMENTS

| | | | |
|---|---|---|---|
| 6,509,076 B1 * | 1/2003 | Otaki et al. | 428/40.1 |
| 6,777,089 B1 | 8/2004 | Königer et al. | |
| 2004/0042379 A1 * | 3/2004 | Schoeppel | 369/275.1 |

FOREIGN PATENT DOCUMENTS

| | | |
|---|---|---|
| DE | 19709467 C1 | 3/1997 |
| EP | 0352298 B1 | 11/1993 |
| EP | 0874027 A2 | 4/1998 |
| EP | 0874027 A3 | 4/1998 |
| WO | WO00/63015 A1 | 10/2000 |

OTHER PUBLICATIONS

International Preliminary Report on Patentability for International application No. PCT/EP2004/007698.

* cited by examiner

*Primary Examiner* — Philip C Tucker
*Assistant Examiner* — Amjad Abraham
(74) *Attorney, Agent, or Firm* — Cantor Colburn LLP

(57) ABSTRACT

A process for producing polymer moldings with functional surfaces, in which a coating is produced on a support sheet, the coated support sheet is shaped and backed by injection molding or foaming with a liquid polymeric material, and the coating, if this has not already taken place, is cured or after-cured, the coating is covered at least temporarily with a protective sheet.

20 Claims, 2 Drawing Sheets

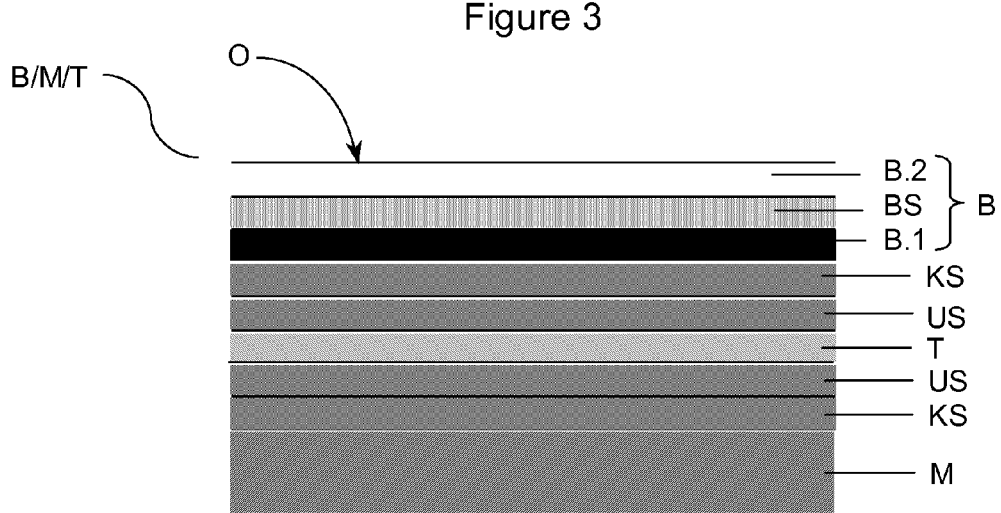

METHOD FOR PRODUCING MOLDED PLASTIC PARTS HAVING FUNCTIONAL SURFACES

CROSS REFERENCE TO RELATED APPLICATIONS

This application is a National Phase Application based on PCT/2004/007698, filed 13 Jul. 2004, which claims priority to DE 10335620, filed 4 Aug. 2003.

FIELD OF THE INVENTION

The present invention relates to a new process for producing polymer moldings with functional surfaces. The present invention also relates to the use of the polymer moldings with functional surfaces produced by means of the novel process.

BACKGROUND OF THE INVENTION

A process for producing polymer moldings (M/T/B) with functional surfaces (O) for which
(I) a coating (B) is produced on a thermoplastic support sheet (T) by
  (I.1) coating one surface (T.1) of (T) with at least one pigmented coating material (B.1) and
  (I.2) coating the resulting film (B.1) with at least one chemically or radiation curable coating material (B.2) to give the film (B.2) which following its curing gives a transparent coating (B.2),
(II) the resulting coated thermoplastic support sheet (T/B) is inserted into an open mold,
(III) the mold is closed and the uncoated side (T.2) of the coated thermoplastic support sheet (T/B) is contacted with a liquid polymeric material (M) to shape the coated thermoplastic support sheet (T/B) and join it firmly to the polymeric material (M), and the polymeric material (M) is caused to solidify, and
(IV) the resulting coated polymer molding (M/T/B), whose coating (B) is uncured, part-cured or full-cured is removed from the mold; where
(V) in step (I) and/or after the end of step (I) and/or in step (III) and/or after step (IV) the uncured or part-cured coating (B) is fully cured or after step (IV) the full-cured coating (B) is aftercured;
the coating (B) being covered at least temporarily with a protective sheet (S), is known from international patent application WO 00/63015 A1. The process, however, gives polymer moldings (M/T/B) having unsatisfactory surface properties. In particular the functional surfaces (O) have inadequate leveling, an inadequate distinctiveness of the reflected image (DOI) and/or inadequate gloss. In many cases they also contain visible surface defects. This applies in particular to those cases where it was necessary to store the process product of step (I) for a relatively long time before carrying out step (II) and/or the process product of step (IV) for a relatively time before carrying out step (V).

Overall the polymer moldings (M/T/B) produced with the known process frequently lack what has been termed automobile quality (in this respect see also European patent EP 0 352 298 B1, page 15 line 42 to page 17 line 40), and so in particular they cannot be used as exterior mounted components for automobile bodies.

The present invention was based on the object of finding a new process for producing polymer moldings (M/T/B) with functional surfaces (O) that no longer has the disadvantages of the prior art but instead gives polymer moldings (M/T/B) having outstanding surface properties. In particular the functional surfaces (O) ought to have outstanding leveling, outstanding distinctiveness of the reflected image (DOI), and very good gloss and ought to contain no visible surface defects. This ought also to apply in particular to those cases in which it is necessary to store the product of step (I) for a relatively long time before carrying out step (II) and/or the product of step (IV) for a relatively long time before carrying out step (V). Overall the polymer moldings (M/T/B) produced by the novel process ought to have what is termed automobile quality (in this respect see also European patent EP 0 352 298 B1, page 15 line 42 to page 17 line 40) so that they can be used in particular as exterior mounted components for automobile bodies, especially for top class automobile bodies.

SUMMARY OF THE INVENTION

With reference now to FIG. 1, the invention accordingly provides the novel process for producing polymer moldings (M/T/B) with functional surfaces (O) for which
(I) a coating (B) is produced on a thermoplastic support sheet (T) by
  (I.1) coating one surface (T.1) of (T) with at least one pigmented coating material (B.1) and
  (I.2) coating the resulting film (B.1) with at least one chemically or radiation curable coating material (B.2) to give the film (B.2) which following its curing gives a transparent coating (B.2),
(II) the resulting coated thermoplastic support sheet (T/B) is inserted into an open mold,
(III) the mold is closed and the uncoated side (T.2) of the coated thermoplastic support sheet (T/B) is contacted with a liquid polymeric material (M) to shape the coated thermoplastic support sheet (T/B) and join it firmly to the polymeric material (M), and the polymeric material (M) is caused to solidify, and
(IV) the resulting coated polymer molding (M/T/B), whose coating (B) is uncured, part-cured or full-cured is removed from the mold; where
(V) in step (I) and/or after the end of step (i) and/or in step (III) and/or after step (IV) the uncured or part-cured coating (B) is fully cured or after step (IV) the full-cured coating (B) is aftercured;
the coating (B) being covered at least temporarily with a protective sheet (S), wherein the protective sheet (S) has
(s.1) a storage modulus E' of at least $10^7$ Pa in the temperature range from room temperature to 100° C.,
(s.2) an elongation at break >300% at 23° C. longitudinally and transversely to the preferential direction produced by means of directed production processes in the production of (S),
(s.3) a transmittance >70% for UV radiation and visible light with a wavelength of from 230 to 600 nm for a film thickness of 50 μm
and wherein the coating (B)-facing side (S.1) of the protective sheet (S) has
(s.1.1) a hardness <0.06 GPa at 23° C. and
(s.1.2) a roughness corresponding to an R over a sampling area of 50 μm of <30 nm as determined by means of atomic force microscopy (AFM)

The novel process for producing polymer moldings (M/T/B) with functional surfaces (O) is referred to below as "process of the invention".

Additional subject matter of the invention will emerge from the description.

In the light of the prior art it was surprising and unforeseeable for the skilled worker that the object on which the present invention was based could be achieved by means of the process of the invention.

In particular it was surprising that the process of the invention no longer had the disadvantages of the prior art but instead gave polymer moldings (M/T/B) having outstanding surface properties. Their functional surfaces (O) had outstanding leveling, outstanding distinctiveness of the reflected image (DOI), and very good gloss and no longer contained any visible surface defects. This was also true in those cases where the product of step (i) had been stored for a relatively long time before step (II) was carried out and/or the product of step (IV) had been stored for a relatively long time before step (V) was carried out.

A particular surprise was the extremely broad applicability of the polymer moldings (M/T/B) produced with the process of the invention. Thus they could be put to outstanding use for producing means of transport, constructions, windows, doors, furniture, and utility articles of any kind. In particular, however, they had what is referred to as automobile quality (in this respect see European patent EP 0 352 298 B1, page 15 line 42 to page 17 line 40) and so could be used in particular as exterior mounted components for automobile bodies, especially for top class automobile bodies.

BRIEF DESCRIPTION OF THE DRAWINGS

Referring now to the exemplary drawings, wherein the elements are given the capital letter and alphanumeric designations set forth in the specification, and wherein arrows refer to surfaces of layers:

FIG. 3 is a side view of the polymer molding (M/T/B), wherein thermoplastic support sheet (T) has adhesive layers (KS) and transition layers (US), and wherein the coating (B) comprises a pigmented coating material (B.1), an imagewise coating (BS), and a chemically or radiation curable coating material (B.2).

DETAILED DESCRIPTION OF THE INVENTION

The process of the invention starts in step (I) from the production of a coating (B) on one surface (T.1) of a thermoplastic support sheet (T).

The coating (B) is produced by coating the surface (T.1) of (T) in a step (I.1) with at least one, especially one, coating material (B.1). Coating can take place over the full area or in the form of an image. It preferably takes place over the full area. The resulting film or films (B.1) can be single-layer or multilayer films, especially two-layer films.

The film or films (B.1) are coated in step (I.2) with at least one, especially one, chemically or radiation curable coating material (B.2) to give at least one, especially one, film (B.2) which after it has been cured gives a transparent coating (B.2), in particular a clear transparent coating (B.2).

Figure 1:
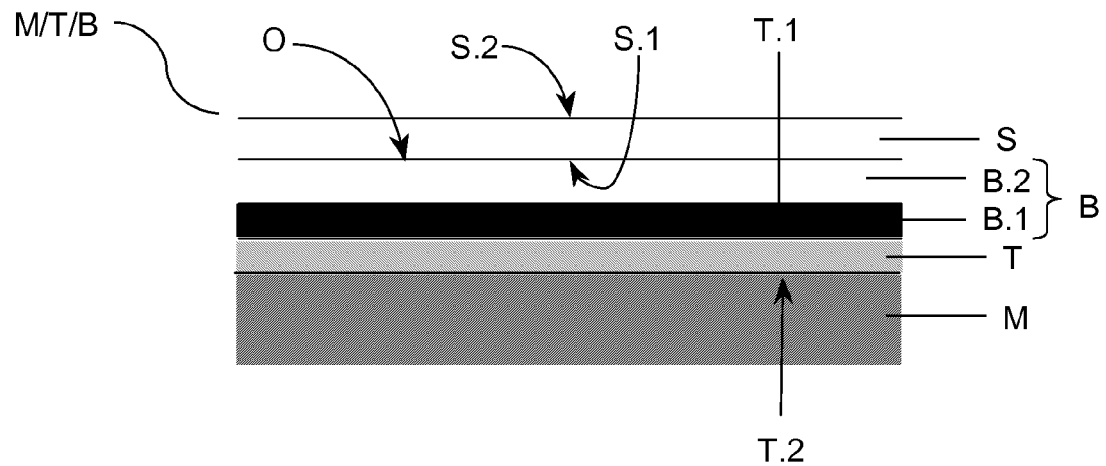
FIG. 1 is a side view of the polymer molding (M/T/B) with functional surface (O) and protective sheet (S), wherein coating (B) comprises pigmented coating material (B.1) and chemically or radiation curable coating material (B.2).
Figure 2:
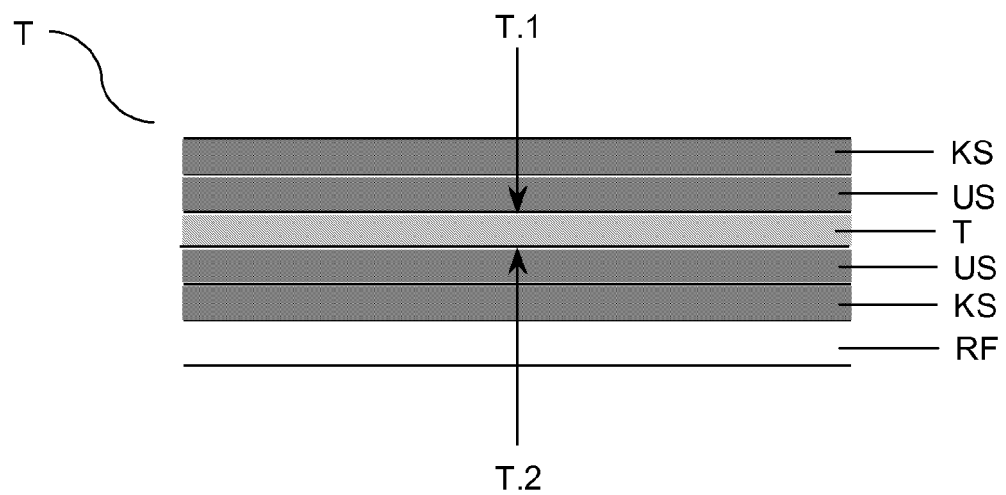
FIG. 2 is a side view of the thermoplastic support sheet (T) with further adhesive layers (KS), transition layers (US), and removable release film (RF).

With reference now to FIG. 2, the thermoplastic support sheet (T) may be a single-layer sheet or may comprise at least one further adhesive layer (KS), transition layers (US), or removable release film (RF).

In particular it is possible for (T) to contain at least one, especially one, adhesive layer (KS) on the side (T.2) facing away from the subsequent coating (B). Between the adhesive layer (KS) and the surface of (T.2) it is also possible for there to be a transition layer (US). For provisional protection, the adhesive layer (KS) can be lined with an easily removable release film (RF) which is removed prior to step (II).

Between the surface (T.1) and the subsequent coating (B) it is possible for there to be at least one, especially one, adhesive layer (KS). In that case there can be at least one, especially one, transition layer (US) between the surface (T.1) and the adhesive layer (KS) and/or between the adhesive layer (KS) and the coating (B).

The support sheet (T) is composed essentially or entirely of at least one thermoplastic polymer. The thermoplastic polymer is preferably selected from the group consisting of conventional, linear, branched, star, comb and/or block homopolymers and copolymers. The homopolymers and copolymers are preferably selected from the group consisting of polyurethanes, polyesters, especially polyethylene terephthalates and polybutylene terephthalates, polyethers, polyolefins, polyamides, polycarbonates, polyvinyl chlorides, polyvinylidene fluorides, poly(meth)acrylates, especially polymethyl methacrylates and impact-modified polymethyl methacrylates, polystyrenes, especially impact-modified polystyrenes, particularly acrylonitrile-butadiene-styrene (ABS) copolymers, acrylic-styrene-acrylonitrile copolymers (ASA), and acrylonitrile-ethylene-propylene-diene-styrene copolymers (A-EPDM); polyetherimides, polyether ketones, polyphenylene sulfides, polyphenylene ethers, and mixtures of these polymers.

With particular advantage use is made of ASA, blends of ASA and polycarbonates, polymethyl methacrylates or impact-modified polymethyl methacrylates.

The homopolymers and copolymers can comprise the additives conventional in the field of thermoplastics. In addition they may comprise conventional fillers, including reinforcing fillers, and fibers. Not least they may also comprise the below-described pigments and/or conventional dyes.

As transition layers (US) it is possible to use conventional layers of thermoplastic materials preferably from 1 to 50 μm thick, composed in particular of the thermoplastic polymers described above.

As adhesive layers (KS) it is possible to use conventional layers of thermoplastic contact adhesives, preferably from 1 to 10 μm thick.

The support sheet (T), including any further layer or layers (WS) present, is preferably more than 0.5 mm, more preferably more than 0.6 mm and in particular more than 0.7 mm thick.

The pigmented coating material (B.1) comprises at least one pigment. The pigment is preferably selected from the group consisting of organic and inorganic color pigments, effect pigments, color and effect pigments, magnetic shielding pigments, electroconductive pigments, anticorrosion pigments, fluorescent pigments, and phosphorescent pigments.

Preference is given to using the color and/or effect pigments.

The curable coating material (B.2) is curable chemically, i.e. thermally or with actinic radiation, in particular with actinic radiation. After it has been applied and the film (B.2) has been formed and cured it produces a transparent coating (B.2), in particular a clear transparent coating (B.2).

Here and below actinic radiation refers to electromagnetic radiation, such as near infrared (NIR), visible light, UV radiation, X-rays and gamma radiation, in particular UV radiation, and corpuscular radiation, such as electron beams, beta radiation, alpha radiation, neutron beams, and proton beams, especially electron beams.

The curable coating material (B.2) is liquid or solid. It may comprise transparent pigments and fillers. It may also comprise molecularly dispersely soluble dyes. Preferably, however, it is free from transparent pigments and fillers and also from dyes.

Suitable coating materials (B.2) are all conventional clearcoat materials.

The above-described pigmented coating materials (B.1) and clearcoat materials (B.2) can be applied to (T.1) by means of any application methods which are conventional for coating materials.

In principle the pigmented coating material (B.1) can be applied to the surface (T.1) over the full area or in the form of an image. It is preferably applied over the full area.

Prior to the application of the coating material (B.2) it is possible if necessary further to apply at least one image-form layer (BS), one adhesive layer (KS) and/or one transition layer (US) to the surface of the film (B.1).

Step (I) results in a coated thermoplastic support sheet (T/B). Its coating (B) can be uncured, part-cured or full-cured.

Depending on what thermoplastic support sheet (T) has been used the coated thermoplastic support sheet (T/B) may comprise at least one further layer (WS).

In particular it may contain at least one, especially one, adhesive layer (KS), on the side (T.2) facing away from the coating (B). Between the adhesive layer (KS) and the surface of (T.2) there may also be a transition layer (US). For temporary protection the adhesive layer (KS) may have been lined with an easily removable release film (RF).

Between the surface (T.1) and the coating (B) there may also be at least one, especially one, adhesive layer (KS). In that case it is possible for there to be at least one, especially one, transition layer (US) between the surface (T.1) and the adhesive layer (KS) and/or between the adhesive layer (KS) and the coating (B).

Within the coating (B) it is possible for there to be also at least one image-form layer (BS), one adhesive layer (KS) and/or one transition layer (US) between the film (B.1) and the film (B.2).

The coated thermoplastic support sheet (T/B) can be processed further immediately after it has been produced or it can be stored in the form of rolls, where appropriate, before step (II) is carried out In step (II) of the process the coated thermoplastic support sheet (T/B) described above is inserted into an opened mold, in particular a thermoforming mold. For this purpose the (T/B) can be wound from a roll and cut into appropriately dimensioned pieces. It is also possible for (T/B) and the cut-to-size pieces to be preformed, and in particular for them to be adapted to the contours of the molds.

In step (III) of the process the mold is closed and the uncoated side (T.2) of the coated thermoplastic support sheet (T/B) is contacted with a liquid polymeric material (M) to shape the coated thermoplastic support sheet (T/B) and join it firmly to the polymeric material (M). The polymeric material (M) can then be caused to solidify.

The liquid polymeric material (M) preferably comprises at least one melted thermoplastic polymer, in particular at least one of the above-described thermoplastic polymers, or consists thereof. The version of the process in which a melted thermoplastic polymer of this kind is used is also referred to as injection molding.

Alternatively the liquid polymeric material can comprise a conventional reactive mixture which forms the solid polymeric material (M) within the mold. In this case the polymeric material (M) may comprise the additives described above in connection with the support film (T). The version of the process which uses a reactive mixture (M) of this kind is also referred to as reaction-injection molding (RIM).

The result of step (II) is the coated polymer molding (M/T/B), whose coating (B) is uncured, part-cured or full-cured.

In step (IV) of the process the coated polymer molding (M/T/B) is removed from the mold. It can be processed further immediately thereafter or stored until step (V) is carried out In step (V) of the process the coating (B) is cured.

In step (I) and/or after step (I) and/or in step (III) and/or after step (IV) the uncured or part-cured coating (B) is fully cured or after step (IV) the full-cured coating (B) is aftercured.

Preferably the coating (B), in particular the film (B.2), is partly or fully cured, in particular partly cured, in step (I) and/or after step (I) before step (II). With particular preference the coating (B), in particular the film (B.2), is partly or fully cured in step (I) and/or after step (I) following the deformation, in particular the adaptation of the coated thermoplastic support sheet (T/B) to the contour of the mold into which (T/B) is inserted in step (II).

The part-cured coating (B), in particular the coating (B.2), is subsequently fully cured in step (III) and/or after step (IV).

If the coating (B), in particular the coating (B.2) which is present after steps (I) or (III) is already full-cured, it is aftercured following step (IV) to raise its crosslinking density.

The methods and apparatus used for curing are governed by the physical make-up of the coating (B), i.e., by whether the coating (B) comprises films (B.1) and (B.2) which are curable physically, thermally or with actinic radiation.

In one advantageous procedure the film (B.2) is fully cured after step (I) following deformation, in particular adaptation of the coated thermoplastic support sheet (T/B) to the contour of the mold, but before step (II). The film (B.1) is then partly or fully cured in step (III). The resulting full-cured coating (B.2) can then be aftercured after step (IV). The resulting polymer molding (M/T/B) can be preferably thermally aftertreated in order to effect full curing of an only part-cured coating (B.1) and/or to raise the crosslinking density of a full-cured coating (B.1) and/or (B.2).

During the implementation of the process of the invention the coating (B) is covered at least temporarily with a protective sheet (S).

In the process of the invention the protective sheet (S) is applied to the coating (B) preferably after step (I), more preferably before step (II), and in particular before the coated thermoplastic support sheet (T/B) is preformed, in particular by being adapted to the contour of the mold. With very particular preference the protective sheet (S) is placed onto the uncured coating (B), in particular the uncured film (B.2).

In the context of the process of the invention the resultant coated, thermoplastic, protective sheet (S)-covered support sheet (T/B/S) can be processed further in a variety of ways.

First it is possible for (T/B/S) to be processed further immediately following its production or to be wound up to form a roll and stored in that form until further processing.

In a first preferred version the protective sheet (S) can be removed from the coating (B) of (T/B/S) prior to step (II). This can be done before or after, in particular after, (T/B) or (T/B/S) is or has been preformed, in particular by being adapted to the contour of the mold. With very particular preference the protective sheet (S) is removed before or after, in particular before, the film (B.2) of the coating (B) of the preformed (T/B/S) is or has been partly or fully cured, in particular fully cured, especially with actinic radiation, prior to step (II).

In a second preferred version the protective sheet (S) can be removed from the coating (B) of the polymer molding (M/T/B/S) after step (IV). This can be done before or after the full curing of the coating (B) or before or after the thermal aftertreatment of the polymer molding (M/T/B).

With very particular preference the first preferred version is used.

For the protective sheet (S) for inventive use it is essential that it has a storage modulus E' of at least $10^7$ Pa, in particular $10^7$ to $10^8$ Pa, in the temperature range from room temperature to 100° C. This storage modulus E' is measured by dynamic mechanical thermal analysis (DMTA) on free films (in this respect see German patent DE 197 09 467 C2).

For the protective sheet (S) for inventive use it is also essential that it has an elongation at break of >300%, in particular 400 to 900%, longitudinally and transversely to the preferential direction produced in the course of its production by means of directed production processes at 23° C., such as extrusion or film blowing.

It is further essential for the protective sheet (S) for inventive use that it has a transmittance >70% for UV radiation and visible light with a wavelength of from 230 to 600 nm for a film thickness of 50 μm.

Not least it is essential for the protective sheet (S) for inventive use that the coating (B)-facing side (S.1) has a hardness <0.06 GPA, in particular <0.02 GPa, at 23° C. (nanohardness, measured with a Berkovich indenter at 1 mN) and a roughness Ra value over a sampling area of 50 μm$^2$ of <30 nm, in particular <25 nm, as measured by means of atomic force microscopy (AFM).

The removal of the protective sheet (S) for inventive use from the coating (B) preferably requires an averaged force of <250 mN/cm, more preferably <100 mN/cm, and in particular <60 mN/cm.

The protective sheet (S) for inventive use is preferably selected from the group consisting of films made of polyethylene, polypropylene, ethylene copolymers, propylene copolymers, and ethylene-propylene copolymers.

It is of advantage if the side (S.1) of the protective sheet (S) has adhesive properties.

It is also of advantage if the side (S.2) of the protective sheet (S) that faces away from the coating (B) has antiblocking properties.

Particularly advantageous protective sheets (S) are constructed from a plurality of layers.

Especially advantageous protective sheets (S) are constructed from at least one core layer (KNS) comprising at least one homopolymer or copolymer and from at least one further layer selected from the group consisting of adhesive layers (KS) and antiblocking layers (AS).

It is of advantage if the adhesive layers (KS) and the antiblocking layers (AS) are thermoplastic.

The homopolymers and copolymers of the core layer (KNS) are preferably selected from the group consisting of polyethylene, polypropylene, ethylene copolymers, propylene copolymers, and ethylene-propylene copolymers.

The thickness of the protective sheets (S) is with very particular preference from 10 to 100 μm, in particular from 30 to 70 μm.

The protective sheets (S) for inventive use are conventional.

The process of the invention produces the polymer moldings (M/T/B) with the functional surfaces (O) with outstanding reproducibility.

Depending on what pigments there are in the coatings (B), especially in the pigmented coatings (B.1), the functionality of the surface (O) is one which imparts color, effect, color and effect, electroconductivity, magnetic shielding, inhibition of corrosion, fluorescence and/or phosphorescence. The surface (O) may also have two or more functions simultaneously. In particular the surface (O) imparts color and/or effect.

With reference now to FIG. 3, depending upon what starting products and starting films have been used, it is possible for the polymer moldings (M/T/B) to comprise at least one further layer in addition to the polymeric material (M), the support sheet (T) and the coating (B).

By way of example there may be at least one adhesive layer (KS), between (M) and (T), between (T) and (B) and/or between (B.1) and (B.2). Instead of or in addition to the adhesive layers (KS) it is possible for there to be transition layers (US). (B.1) may also be covered by an imagewise coating (BS), or (B.1) itself may be an imagewise coating. By way of example the polymer moldings (M/T/B) may have the following construction:

(M)/(KS)/(US)/(T)/(US)/(KS)(B.1)/(BS)/(B.2)

as depicted in FIG. 3.

The polymer moldings (M/T/B) with the functional surfaces (O) have outstanding surface properties. Their functional surfaces (O) have outstanding leveling, outstanding distinctiveness of the reflected image (DOI), and very good gloss and no longer contain any visible surface defects. This applies even in those cases where the product of step (I) has been stored for a relatively long time before step (II) is carried out and/or where the product of step (IV) has been stored for a relatively long time before step (V) is carried out.

The usefulness of the polymer moldings (M/T/B) is extremely broad. For instance they may be put to outstanding use for producing means of transport, constructions, windows, doors, furniture, and utility articles of any kind. They are preferably used for producing means of transport operated by muscle power and/or with engines, particularly watercraft, rail vehicles, aircraft, cycles, motorcycles, automobiles, trucks, and buses.

Since they have what is termed automobile quality (in this respect, see also European patent EP 0 352 298 B1, page 15 line 42 to page 17 line 40), they possess in particular outstanding suitability as exterior mounted components for automobile bodies, especially for top class automobile bodies.

EXAMPLES

Production Example 1

The Production of a Coated Thermoplastic Support Sheet

A coated thermoplastic support sheet was produced by continuous application of coating materials (B.1) and (B.2) on a laboratory coating installation.

The support sheet used was a thermoplastic sheet of Luran® S 778 TE with a thickness of 800 μm. The applied films (B.1) and (B.2) were dried.

The resulting sheet was wound to a roll for further coating.

Example 1

The Production of Polymer Moldings

The polymer moldings of example 1 were produced using the coated thermoplastic support sheet of production example 1.

For example 1 the coated thermoplastic support sheet of production example 1 was coated with the protective sheet in accordance with the presently described invention, which protective sheet, under the trademark GH-X 527, was obtained from Bischof+Klein, Lengerich.

Table 1 gives an overview of the key properties of the protective sheet used.

TABLE 1

The key properties of the protective sheet used

| Properties: | Protective sheet: GH-X 527 |
|---|---|
| Film thickness (μm) | 50 |
| Storage modulus E' at room temperature to 100° C., determined by DMTA (Pa) | $10^7$–$10^8$ |
| Elongation at break longitudinal/transverse (%) | 430/840 |
| Transmittance for UV radiation and visible light with a wavelength of 230 to 600 nm | >70% |
| Hardness of the protective sheet on the coating-facing attachment side (nanohardness measured with a Berkovich indenter at 1 mN and 23° C.) (GPa) | 0.0128 |
| Roughness $R_a$ (by atomic force microscopy (AFM) from 50 μm²) (nm) | 16.7 |

The coated thermoplastic support sheet which had been coated with the protective sheet was preformed. Thereafter the film (B.2) was partly cured with UV radiation through the protective sheet. As the positive mold a cube was used. The resulting preformed part was inserted into a mold. The mold was closed and the cube was injection molded with a liquid polymeric material. The resulting polymer molding was cooled and removed from the mold. Subsequently the part-cured film (B.2) was fully cured with UV radiation. Thereafter the protective sheet was removed.

The polymer moldings produced in this way had a high-gloss surface with no defects.

What is claimed is:

1. A process for producing polymer moldings (M/T/B) with functional surfaces (O) for which
   (I) a coating (B) is produced on a thermoplastic support sheet (T) by a process comprising
      (I.1) coating one surface (T.1) of (T) with at least one pigmented coating material (B.1), and
      (I.2) coating the resulting film (B.1) with at least one chemically or radiation curable coating material (B.2) to give the film (B.2) that, following its curing, becomes a transparent coating (B.2),
   (II) inserting the resulting coated thermoplastic support sheet (T/B) into an open mold, wherein the coated thermoplastic support sheet (T/B) or the cut-to-size pieces thereof are preformed prior to step (II),
   (III) closing the mold and contacting the uncoated side (T.2) of the coated thermoplastic support sheet (T/B) with a liquid polymeric material (M) to shape the coated thermoplastic support sheet (T/B) and join it firmly to the polymeric material (M), and causing the polymeric material (M) to solidify, and
   (IV) removing from the mold, the resulting coated polymer molding (M/T/B), whose coating (B) is uncured, part-cured or full-cured;
   the coating (B) being covered at least temporarily with a protective sheet (S), wherein the protective sheet (S) is applied to the coating (B) after step (I) and before the coated thermoplastic support sheet (T/B) is preformed and wherein the protective sheet (S) comprises a layer selected from the group consisting of films made of polyethylene, polypropylene, ethylene copolymers, propylene copolymers, and ethylene-propylene copolymers, and wherein the protective sheet has
   (s.1) a storage modulus E' of from $10^7$ to $10^8$ Pa in the temperature range from room temperature to 100° C.,
   (s.2) an elongation at break of from 400 to 900% at 23° C. longitudinally and transversely to the preferential direction produced by means of directed production processes in the production of (S),
   (s.3) a transmittance >70% for UV radiation and visible light with a wavelength of from 230 to 600 nm for a film thickness of 50 μm;
   wherein the coating (B)-facing side (S.1) of the protective sheet (S) has
   (s.1.1) a hardness <0.06 GPa at 23° C., and
   (s.1.2) a roughness corresponding to an $R_a$ value over a sampling area of 50 μm² of <30 nm as determined by means of atomic force microscopy (AFM),
   wherein the film (B.2) is fully or partly cured with UV radiation after step (I), but before step (II), following deformation to adapt the coated thermoplastic support sheet (T/B) to the contour of the mold, wherein the resulting full-cured coating (B.2) is optionally after-cured after step (IV) or the resulting part-cured coating (B.2) is fully cured after step (IV), and the resulting polymer molding (M/T/B) is optionally thermally after-treated to raise the crosslink density of (B.2),
   wherein the functionality of the surface (O) of the polymer moldings (M/T/B) is one which imparts at least one of color, effect, electroconductivity, magnetic shielding, inhibition of corrosion, fluorescence, or phosphorescence, and
   wherein the polymer moldings are designed for use in a means of transport selected from the group consisting of watercraft, rail vehicles, aircraft, cycles, motorcycles, automobiles, trucks, and buses.

2. The process of claim 1, wherein the coating (B)-facing side (S.1) of the protective sheet (S)
   (s.1.1) has a hardness <0.02 GPa.

3. The process of claim 1, wherein
   (s.5) the removal of the protective sheet (S) from the coating (B) requires an averaged force <250 mN/cm.

4. The process of claim 1, wherein the side (S.1) of the protective sheet (S) has adhesive properties.

5. The process of claim 1, wherein the side (S.2) of the protective sheet (S) that faces away from the coating (B) has antiblocking properties.

6. The process of claim 1, wherein the protective sheet (S) is constructed from a plurality of layers.

7. The process of claim 6, wherein said layer of the protective sheet (S) is a core layer (KNS) and the protective sheet comprises at least one further layer selected from the group consisting of adhesive layers (KS) and antiblocking layers (AS).

8. The process of claim 1, wherein the thickness of the protective sheet (S) is from 10 to 100 μm.

9. The process of claim 1, wherein the protective sheet (S) is removed from the coating (B) of the coated, thermoplastic, protective-sheet (S)-covered support sheet (T/B/S) immediately before step (II).

10. The process of claim 1, wherein the protective sheet (S) is removed from the coating (B) of the protective sheet (S)-covered polymer molding (M/T/B/S) after step (IV).

11. The process of claim 10, wherein the protective sheet (S) is removed from the coating (B) at least one of before or after the coating (B) has been fully cured or before or after the molding (M/T/B) has been after-treated.

12. The process of claim 1, wherein the thermoplastic support sheet (T) has a film thickness $\geq 0.5$ mm.

13. The process of claim 1, wherein the coated thermoplastic support sheets (T/B) or the cut to size pieces thereof are adapted to the contour of the molds.

14. The process of claim 1, wherein the functionality of the surface (O) of the polymer moldings (M/T/B) is one which imparts at least one of color, effect, electroconductivity, magnetic shielding, inhibition of corrosion, fluorescence or phosphorescence.

15. A means of transport comprising the polymer moldings produced by the process of claim 1, wherein the means of transport is selected from the group consisting of watercraft, rail vehicles, aircraft, cycles, motorcycles, automobiles, trucks, and buses.

16. The process of claim 1 for producing polymer moldings (M/T/B) with functional surfaces (O), wherein the polymer moldings are exterior mounted components for automobile bodies, and wherein the protective sheet (S) has a thickness of from 10 to 100 µm and is constructed from a plurality of layers, wherein said layer of the protective sheet (S) is a core layer (KNS) and the protective sheet (S) further comprises at least one further layer selected from the group consisting of adhesive layers (KS) and antiblocking layers (AS)
    wherein the coating (B)-facing side (S.1) of the protective sheet (S) has
        (s.1.1) a hardness of less than 0.02 GPa at 23° C., and
        (s.1.2) a roughness corresponding to an $R_a$ value over a sampling area of 50 µm² of less than 25 nm as determined by means of atomic force microscopy (AFM).

17. The process of claim 16 wherein the film (B-2) is partly cured with UV radiation after step (I), but before step (II), following deformation to adapt the coated thermoplastic support sheet (T/B) to the contour of the mold, and the resulting part-cured coating (B.2) is fully cured after step (IV), and the resulting polymer molding (M/T/B) is optionally thermally after-treated to raise the crosslink density of (B.2).

18. The process of claim 16 wherein the film (B-2) is fully cured with UV radiation after step (I), but before step (II), following deformation to adapt the coated thermoplastic support sheet (T/B) to the contour of the mold, wherein the resulting full-cured coating (B.2) is after-cured after step (IV), and the resulting polymer molding (M/T/B) is optionally thermally after-treated to raise the crosslink density of (B.2).

19. A process for producing polymer moldings (M/T/B) with functional surfaces (O) for which
    (I) a coating (B) is produced on a thermoplastic support sheet (T) by a process comprising
        (I.1) coating one surface (T.1) of (T) with at least one pigmented coating material (B.1), and
        (I.2) coating the resulting film (B.1) with at least one chemically or radiation curable coating material (B.2) to give the film (B.2) that, following its curing, becomes a transparent coating (B.2),
    (II) inserting the resulting coated thermoplastic support sheet (I/B) into an open mold, wherein the coated thermoplastic support sheets (T/B) or the cut-to-size pieces thereof are preformed prior to step (II),
    (III) closing the mold and contacting the uncoated side (T.2) of the coated thermoplastic support sheet (T/B) with a liquid polymeric material (M) to shape the coated thermoplastic support sheet (T/B) and join it firmly to the polymeric material (M), and causing the polymeric material (M) to solidify, and
    (IV) removing from the mold, the resulting coated polymer molding (M/T/B), whose coating (B) is uncured, part-cured or full-cured;
    the coating (B) being covered at least temporarily with a protective sheet (S), wherein the protective sheet (S) is applied to the coating (B) after step (I) and before the coated thermoplastic support sheet (T/B) is preformed and wherein the protective sheet (S) has a thickness of from 10 to 100 µm, wherein the protective sheet (S) is constructed from a plurality of layers and comprises a core layer (KNS) comprising at least one homopolymer or copolymer selected from the group consisting of films made of polyethylene, polypropylene, ethylene copolymers, propylene copolymers, and ethylene-propylene copolymers, wherein at least one further layer is selected from the group consisting of adhesive layers (KS) and antiblocking layers (AS), and wherein the protective sheet has
        (s.1) a storage modulus E' of from $10^7$ to $10^8$ Pa in the temperature range from room temperature to 100° C.,
        (s.2) an elongation at break of from 400 to 900% at 23° C. longitudinally and transversely to the preferential direction produced by means of directed production processes in the production of (S),
        (s.3) a transmittance >70% for UV radiation and visible light with a wavelength of from 230 to 600 nm for a film thickness of 50 µm;
    wherein the coating (B)-facing side (S.1) of the protective sheet (S) has
        (s.1.1) a hardness <0.06 GPa at 23° C., and
        (s.1.2) a roughness corresponding to an $R_a$ value over a sampling area of 50 µm² of <30 nm as determined by means of atomic force microscopy (AFM),
    wherein the film (B.2) is fully or partly cured with UV radiation after step (I), but before step (II), following deformation to adapt the coated thermoplastic support sheet (T/B) to the contour of the mold, wherein the resulting full-cured coating (B.2) is optionally after-cured after step (IV) or the resulting part-cured coating (B.2) is fully cured after step (IV), and the resulting polymer molding (M/T/B) is optionally thermally after-treated to raise the crosslink density of (B.2),
    wherein the functionality of the surface (O) of the polymer moldings (M/T/B) is one which imparts at least one of color, effect, electroconductivity, magnetic shielding, inhibition of corrosion, fluorescence, or phosphorescence, and
    wherein the polymer moldings are designed for use in a means of transport selected from the group consisting of watercraft, rail vehicles, aircraft, cycles, motorcycles, automobiles, trucks, and buses.

20. A process for producing polymer moldings (M/T/B) with functional surfaces (O) for which
    (I) a coating (B) is produced on a thermoplastic support sheet (T) by a process comprising
        (I.1) coating one surface (T.1) of (T) with at least one pigmented coating material (B.1), and
        (I.2) coating the resulting film (B.1) with at least one chemically or radiation curable coating material (B.2) to give the film (B.2) that, following its curing, becomes a transparent coating (B.2),
    (II) inserting the resulting coated thermoplastic support sheet (I/B) into an open mold, wherein the coated thermoplastic support sheets (T/B) or the cut-to-size pieces thereof are preformed prior to step (II),
    (III) closing the mold and contacting the uncoated side (T.2) of the coated thermoplastic support sheet (T/B)

with a liquid polymeric material (M) to shape the coated thermoplastic support sheet (T/B) and join it firmly to the polymeric material (M), and causing the polymeric material (M) to solidify, and (IV) removing from the mold, the resulting coated polymer molding (M/T/B), whose coating (B) is uncured, part-cured or full-cured;

the coating (B) being covered at least temporarily with a protective sheet (S), wherein the protective sheet (S) is applied to the coating (B) after step (I) and before the coated thermoplastic support sheet (T/B) is preformed and wherein the protective sheet (S) having a thickness of from 30 to 70 μm, wherein the protective sheet (S) is constructed from a plurality of layers and comprises a core layer (KNS) comprising polypropylene and further layers consisting of an adhesive layer (KS) and a thermoplastic antiblocking layer (AS), and wherein the protective sheet has (s.1) a storage modulus E' of from $10^7$ to $10^8$ Pa in the temperature range from room temperature to 100° C., (s.2) an elongation at break of from 400 to 900% at 23° C. longitudinally and transversely to the preferential direction produced by means of directed production processes in the production of (S), (s.3) a transmittance >70% for UV radiation and visible light with a wavelength of from 230 to 600 nm for a film thickness of 50 μm;

wherein the coating (B)-facing side (S.1) of the protective sheet (S) has (s.1.1) a hardness <0.06 GPa at 23° C., and (s.1.2) a roughness corresponding to an $R_a$ value over a sampling area of 50 μm² of <30 nm as determined by means of atomic force microscopy (AFM), wherein the film (B.2) is fully or partly cured with UV radiation after step (I), but before step (II), following deformation to adapt the coated thermoplastic support sheet (T/B) to the contour of the mold, wherein the resulting full-cured coating (B.2) is optionally after-cured after step (IV) or the resulting part-cured coating (B.2) is fully cured after step (IV), and the resulting polymer molding (M/T/B) is optionally thermally after-treated to raise the cross slink density of (B.2), wherein the functionality of the surface (O) of the polymer moldings (M/T/B) is one which imparts at least one of color, effect, electroconductivity, magnetic shielding, inhibition of corrosion, fluorescence, or phosphorescence, and wherein the polymer moldings are designed for use in a means of transport selected from the group consisting of watercraft, rail vehicles, aircraft, cycles, motorcycles, automobiles, trucks, and buses.

* * * * *